UNITED STATES PATENT OFFICE.

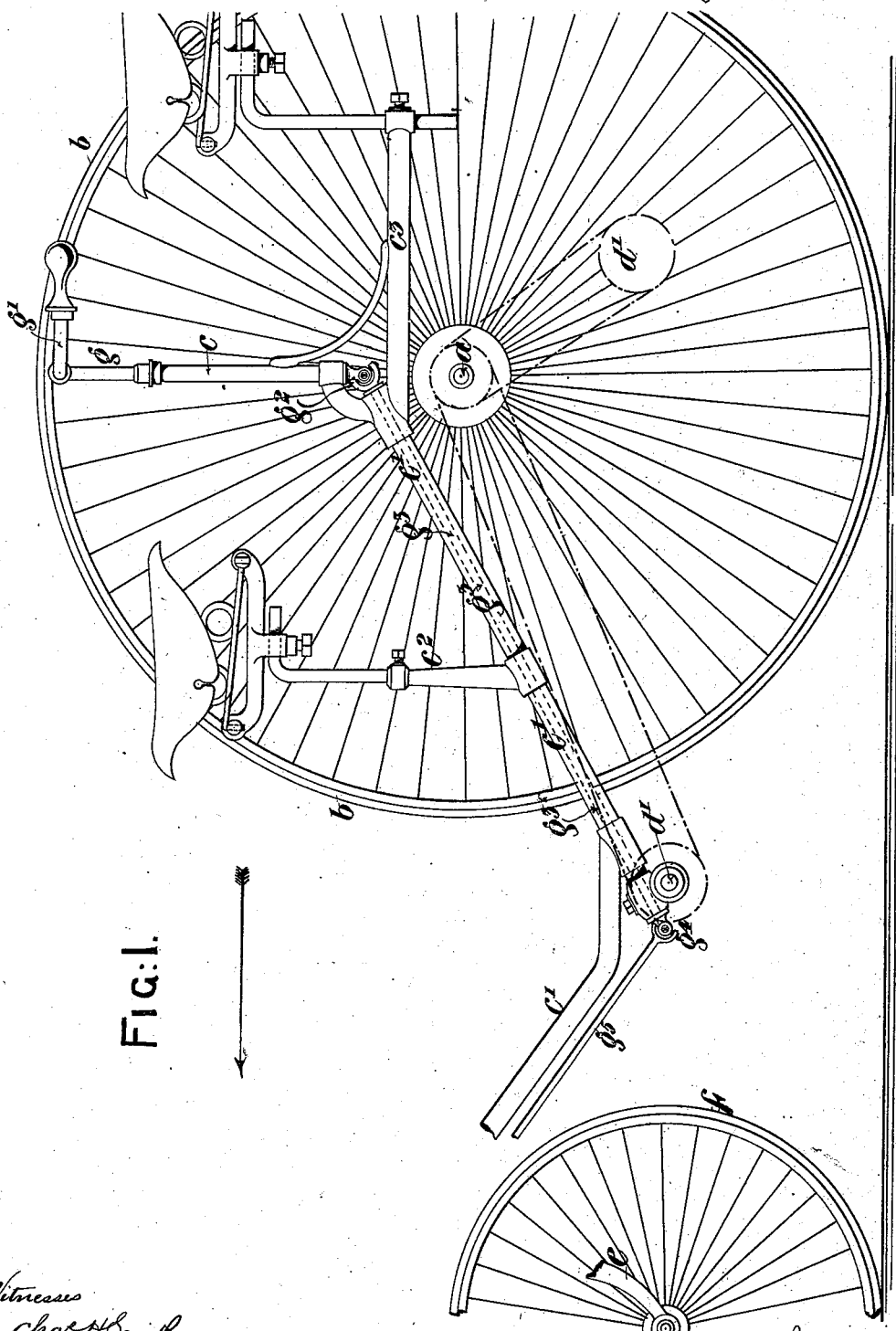

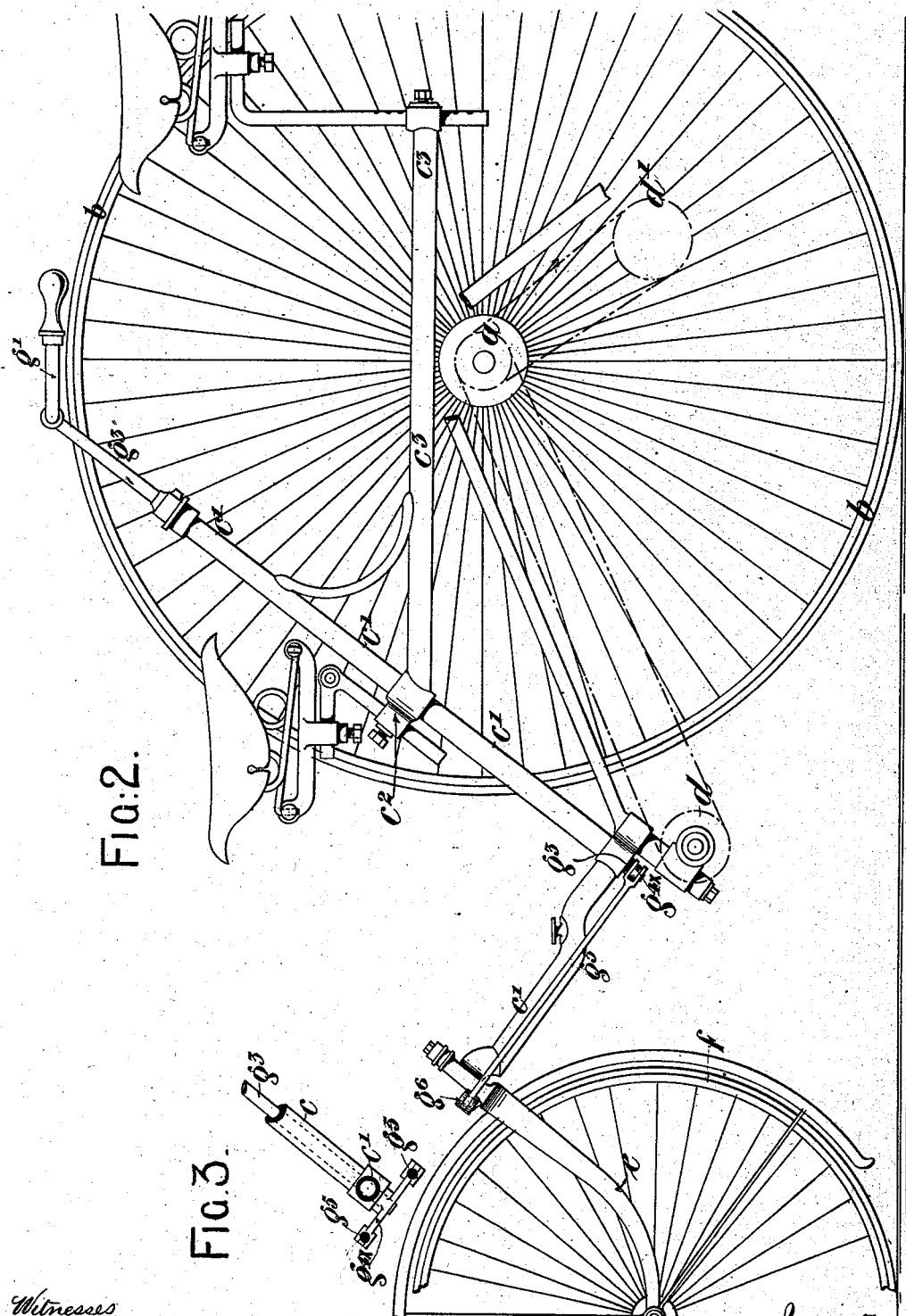

GEORGE SINGER AND RICHARD H. LEA, OF COVENTRY, COUNTY OF WARWICK, ENGLAND.

VELOCIPEDE.

SPECIFICATION forming part of Letters Patent No. 382,837, dated May 15, 1888.

Application filed July 22, 1887. Serial No. 244,982. (No model.) Patented in England March 27, 1886, No. 4,346.

*To all whom it may concern:*

Be it known that we, GEORGE SINGER, bicycle and tricycle manufacturer, and RICHARD HENRY LEA, machinists, subjects of the Queen of Great Britain, residing at Coventry, in the county of Warwick, England, have invented certain new and useful Improvements in Tandem Tricycles and Similar Velocipedes, (for which a patent has been granted us in Great Britain, dated March 27, 1886, No. 4,346,) of which the following is a specification.

Our invention relates to improvements in that class of tricycles known as "tandems," and specially to that type having a single steering-wheel in front; but the invention may also be applied with advantage to other similar velocipedes.

The tandems steered by means of a handle-bar similar to that used for bicycles are at the present time considered superior to those steered by the old system of rack and pinion. Hitherto the former machines have been capable of being steered only by the rider occupying the front seat, except, as we believe, in the case of a form of tandem tricycle which was fitted with a side bar connecting the back and front handles. This, however, proved a clumsy contrivance, and served to imprison the front rider in a dangerous manner in the event of an accident. The general result has therefore been that in the case of the tandem being ridden by a lady and gentleman the lady has had the alternative of accepting the work and responsibility of the steering (which should be undertaken by the gentleman) or of being relegated to the back seat. Our invention obviates all difficulty in this respect, while at the same time we provide neat and reliable mechanism that enables the lady to occupy the front seat, and at the same time gives the gentleman at the rear the entire control of the machine both in regard to steering and brakes.

In order that our invention may be more easily understood and readily carried into effect, we will further describe same with reference to the accompanying drawings.

Figure 1 shows in partial sectional elevation so much of a tandem tricycle constructed according to our invention as is necessary to describe the same. Fig. 2 is a modified arrangement of a more simple character of tandem tricycle than that shown at Fig. 1, and Fig. 3 is a detached view of a portion of the steering-gear.

In the figures, $a$ is the axle of the traveling wheels $b$, fitted, as usual, with balance-gear, and $c$ $c'$ $c^2$ $c^3$ are the main portions of the tubular framing of the machine, provided with suitable bearings for the axle $a$ and the pedal-shafts $d$ and $d'$. The front end of the frame carries the fork $e$, in which is mounted the steering-wheel $f$. Seats for the front and back riders are mounted in the usual manner at Fig. 1 on the upright portion of the frame at $c^2$ and on the back prolongation, $c^3$. Inside the tubes $c$, carrying the rear handle-bar, we provide an inner rod or tube, $g$, which is capable of rotation. At the upper extremity of this inner tube the handle-bar $g'$, brake-lever, and parts connected therewith are fixed, and at the lower end is fitted a so-called "Hooke's" joint, globe or universal joint, $g^2$, to which is connected a tube or rod, $g^3$, placed, preferably, inside the main front tube, $c'$, of the tricycle-frame. The lower end of this second tube or rod, $g^3$, is carried through the frame, and has fitted upon it a small T-piece or cross-head, $g^4$, which is then connected, by two light rods, $g^5$ $g^5$, or other suitable connection, to the steering-fork $e$. When it is not convenient to construct the steering-fork at the same angle of declension as that of the main front tube of frame, the two light connecting-rods referred to are provided at each end with universal joints.

Fig. 2 shows a modification in which the angle of declension of the main tubular frame $c$ is so altered as to render unnecessary the employment of universal joints. In this case the rod $g$ is dispensed with, and the handles $g'$ are attached to the end of the rod $g^3$, which terminates in a cross-head, $g^{4\times}$, (for example as shown separately at Fig. 3,) from whence the steering motion is communicated by the rods $g^5$ $g^5$ to, say, a like parallel cross head or bar, $g^6$, attached to the steering-fork $e$.

The steering motion may be transmitted from the handle-bar by a single rod, $g^5$, in the same vertical plane as the rod $g^3$ and rotating with the latter. In this case the rod $g^5$ may carry a pinion gearing into a toothed segment on the steering-fork $e$, or other suitable connection may be employed.

We thus gain the original object aimed at in such a manner as to also secure the further following advantages: perfect efficiency, the adaptation of the so-called "Hooke's" joints allowing the necessarily irregular line to be followed without the introduction of objectionable backlash; neat appearance, the greater portion of the mechanism being inside the tubular frame and completely hidden; clear front for lady in mounting and dismounting, and with steering connections arranged so low as not to interfere with the dress.

We claim—

The combination, in a two-seat tricycle, with the driving-wheels and front steering-wheel and fork, and the frame having an inclined tube connecting the forward and back portions, of a handle-bar between the two seats, an inclined rod connected to said handle-bar and passing through and below the inclined tube of the frame, a cross-head upon the lower end of this rod, a cross-head upon the upper end of the steering-wheel forks, and two parallel rods or links connecting the respective ends of the cross-heads, substantially as specified.

GEORGE SINGER.
R. H. LEA.

Witnesses:
GEO. WEBB,
*Stoney Stanton Road, Coventry.*
T. W. HARDY,
6 *Portland Terrace, Lower Ford St., Coventry.*